(12) United States Patent
Nishioka et al.

(10) Patent No.: US 11,287,584 B2
(45) Date of Patent: Mar. 29, 2022

(54) CONNECTOR REMOVAL TOOL (71) Applicant: SUMITOMO ELECTRIC INDUSTRIES, LTD., Osaka (JP)

(72) Inventors: Daizo Nishioka, Osaka (JP); Yohei Aoshima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 240 days.

(21) Appl. No.: 16/394,164

(22) Filed: Apr. 25, 2019

(65) Prior Publication Data
US 2020/0341214 A1    Oct. 29, 2020

(51) Int. Cl.
*G02B 6/38* (2006.01)
*B25B 27/14* (2006.01)

(52) U.S. Cl.
CPC ............ *G02B 6/3898* (2013.01); *B25B 27/14* (2013.01)

(58) Field of Classification Search
CPC .... G02B 6/3898; G02B 6/3893; B25B 27/14; B25B 27/146; B25B 27/02; B25B 7/02; B25B 7/00; B25B 7/08; B25B 7/22; B25B 9/00; B25B 33/00; Y10T 29/53909; Y10T 29/53896; Y10T 29/539
USPC ................................ 29/268; 7/125, 126, 127
See application file for complete search history.

(56) References Cited

U.S. PATENT DOCUMENTS

| | | | |
|---|---|---|---|
| 7,020,376 B1 * | 3/2006 | Dang | B25B 9/02 385/135 |
| 10,712,512 B2 * | 7/2020 | Ho | G02B 6/403 |
| 2004/0218885 A1 * | 11/2004 | Segroves | B25B 9/00 385/134 |
| 2005/0207719 A1 * | 9/2005 | Nakano | G02B 6/3807 385/134 |
| 2017/0106510 A1 * | 4/2017 | Galtieri | G02B 6/24 |
| 2020/0284992 A1 * | 9/2020 | Taira | G02B 6/3825 |

FOREIGN PATENT DOCUMENTS

| | | | |
|---|---|---|---|
| CN | 105904355 A | * | 8/2016 |
| CN | 106154431 A | * | 11/2016 |
| JP | H05-21213 U | | 3/1993 |
| JP | H07-281056 A | | 10/1995 |
| JP | 3130804 U | | 4/2007 |
| KR | 20090000742 U | * | 1/2009 |
| KR | 20120057846 A | * | 6/2012 |

* cited by examiner

*Primary Examiner* — Monica S Carter
*Assistant Examiner* — Michael A Gump
(74) *Attorney, Agent, or Firm* — Faegre Drinker Biddle & Reath LLP (57) ABSTRACT

A connector extracting jig according to an embodiment is a connector extracting jig for extracting an optical connector connected to a component to be connected along a connection direction from the component to be connected, the optical connector including a latch engaged with the component to be connected, the latch having a protrusion which is can be pushed down, and the protrusion releasing the engagement of the latch with the component to be connected when being pushed down, the connector extracting jig including: a butting part configured to butt on the optical connector in the connection direction; and a pushing-down part configured to be positioned closer to the component to be connected than the butting part and face the protrusion along a first direction intersecting the connection direction when the butting part butts on the optical connector.

7 Claims, 11 Drawing Sheets

CONNECTOR REMOVAL TOOL

TECHNICAL FIELD

The present disclosure relates to a connector removal tool that extracts an optical connector connected to a component to be connected.

BACKGROUND

Japanese Unexamined Utility Model Publication No. H5-21213 discloses an optical connector detaching tool. The detaching tool includes a guide jig having a notch passing through an optical connector plug, and a removal jig inserted into a guide groove formed in the guide jig. The removal jig has an elongated body and a pair of hooks protruding from both sides of the body in a width direction. In the detaching tool, the optical connector plug is removed in a state in which the pair of hooks of the removal jig is opened and the optical connector plug is coupled between the pair of hooks.

Japanese Utility Model Registration No. 3130804 discloses a common type optical connector detaching tool. The common type optical connector detaching tool holds an SC optical connector. The common type optical connector detaching tool includes two long plate bodies made of a spring material, a holding portion provided at one end of each long plate body, and a handle portion connecting the other ends of the long plate bodies to each other. In the common type optical connector, the SC optical connector is pulled out in a state in which the handle portions are held and the SC optical connector is sandwiched between the pair of holding portions.

Japanese Unexamined Patent Publication No. H7-281056 discloses an optical connector detaching tool. The optical connector detaching tool includes a main body, a grip provided at one end of the main body, and a housing provided at the other end of the main body, and a pair of locking claws is provided on the housing. In the optical connector detaching tool, the pair of locking claws is caught by the locking claws of the optical connector plug and the optical connector is removed by pulling out the grip in this state.

SUMMARY

A connector extracting jig according to an embodiment is a connector extracting jig for extracting an optical connector connected to a component to be connected along a connection direction from the component to be connected, the optical connector including a latch engaged with the component to be connected, the latch having a protrusion that can be pushed down, and the protrusion releasing the engagement of the latch with the component to be connected when being pushed down, the connector extracting jig including: a butting part configured to butt on the optical connector in the connection direction; and a pushing-down part configured to be positioned closer to the component to be connected than the butting part and face the protrusion along a first direction intersecting the connection direction when the butting part butts on the optical connector.

BRIEF DESCRIPTION OF THE DRAWINGS

and

DETAILED DESCRIPTION

Problems to be Solved by the Present Disclosure

In each of the above-mentioned detaching tools, the optical connector is pulled out while the optical connector plug is sandwiched by the pair of locking claws or the like. However, particularly in recent years, in accordance with the increase in data traffic, a multi-core of an optical wiring rack to which the optical connectors are connected is performed and a density of adapters into and from which the optical connectors are inserted and extracted is increased. Therefore, when a type that pulls out the optical connector by being sandwiched between the pair of locking claws or the like is used as described above, it is difficult to position the pair of locking claws relative to the optical connector and there may arise a problem that the optical connector cannot be easily pulled out from the component to be connected such as the adapter.

According to one aspect of the present disclosure, an object of the present disclosure is to provide a connector extracting jig that can easily pull out an optical connector from a component to be connected.

Description of Embodiments

First, contents of embodiments of the present disclosure will be listed and described. A connector extracting jig according to an embodiment is a connector extracting jig for extracting an optical connector connected to a component to be connected along a connection direction from the component to be connected, the optical connector including a latch engaged with the component to be connected, the latch having a protrusion that can be pushed down, and the protrusion releasing the engagement of the latch with the component to be connected when being pushed down, the connector extracting jig including: a butting part configured to butt on the optical connector in the connection direction; and a pushing-down part configured to be positioned closer to the component to be connected than the butting part and face the protrusion along a first direction intersecting the connection direction when the butting part butts on the optical connector.

The connector extracting jig includes a butting part that butts on an optical connector in a connection direction, and a pushing-down part facing a protrusion of a latch of the optical connector when the butting part butts on the optical connector. The optical connector is connected to the component to be connected by the latch being engaged with the component to be connected, and the engagement of the latch with the component to be connected is released by pushing the latch down. In addition, the latch has a protrusion that can be pushed down to release the engagement of the latch when being pushed down, and it is possible to release the engagement of the latch by pushing down the protrusion. The connector extracting jig described above has the pushing-down part facing the protrusion of the latch when the butting part butts. Therefore, since a position of the pushing-down part relative to the protrusion can be automatically determined by butting the butting part against the optical connector, a positioning of the connector extracting jig against the optical connector can be easily performed by butting the butting part on the optical connector. Therefore, the optical connector can be easily pulled out from the component to be connected by automatically performing the positioning and then pushing the protrusion of the latch down by the pushing-down.

The pushing-down part may have a convex portion protruding toward the protrusion. In this case, since the convex portion faces the protrusion, the protrusion of the latch can be easily pushed down by the convex portion of the pushing-down part.

The convex portion may have a scraping surface that scrapes the optical connector to an opposite side of the component to be connected. In this case, it is possible to scrape the optical connector to the opposite side of the component to be connected with the scraping surface in the state in which the protrusion of the latch is pushed down by the convex portion of the pushing-down part. Therefore, the optical connector can be more smoothly pulled out.

The connector extracting jig described above may include a pair of butting parts arranged along a second direction intersecting both the connection direction and the first direction. In this case, since the butting parts are provided in pairs along the second direction, the positioning of the connector extracting jig against the optical connector can be stably performed by butting the pair of butting parts on the optical connector.

The connector extracting jig described above may further include a sandwiching part sandwiching the optical connector together with the pushing-down part and the butting part, a first extending part extending from the pushing-down part and the butting part to an opposite side of the component to be connected, a second extending part extending from the sandwiching part to the opposite side of the component to be connected, and a supporting shaft supporting the first extending part and the second extending part so as to be openable and closable. In this case, the optical connector can be pulled out in a state in which the optical connector is sandwiched by the pushing-down part, the butting part, and the sandwiching part. Therefore, the optical connector can be pulled out in a stable state.

The connector extracting jig described above may further include a handle part extending from the supporting shaft to opposite sides of the first extending part and the second extending part, and closing the first extending part and the second extending part when being gripped. In this case, the connector extracting jig can be shaped like a pincer with the handle part. Therefore, since it is possible to understand intuitively how to use the connector extracting jig, it is possible to make the shape of the connector extracting jig more comfortable to use.

An interval between the butting part and the sandwiching part when the first extending part and the second extending part are opened may be narrower than a width of an accommodating part accommodating the protrusion. In this case, it is possible to prevent the second extending part provided with the sandwiching part from being excessively opened with respect to the first extending part provided with the pushing-down part and the butting part. Therefore, since it is possible to prevent the pushing-down part, the butting part, and the sandwiching part from being excessively opened with respect to the optical connector, the positioning of the connector extracting jig against the optical connector can be more easily performed.

The connector extracting jig described above may further include a surrounding part positioned on the opposite side of the pushing-down part of the butting part, and surrounding the optical connector together with the pushing-down part and the butting part. In this case, it is possible to pull out the optical connector in a state in which the optical connector is surrounded by the pushing-down part, the butting part, and the surrounding part. Therefore, the pull-out of the optical connector can be further stabilized.

The pushing-down part, the butting part, and the surrounding part may have a rectangular shape. In this case, since it is possible to pull out the optical connector surrounded in a rectangular region, the pull-out of the optical connector can be further stabilized.

The connector extracting jig described above further includes an extending part from the pushing-down part, the butting part, and the surrounding part to the opposite side of the component to be connected, and a gripping part positioned at an end of the extending part opposite to the component to be connected, and the pushing-down part may push down the protrusion of the latch by raising the gripping part with the surrounding part as a supporting point. In this case, the pushing-down part can push down the protrusion of the latch by raising the gripping part with the surrounding part as the supporting point. Therefore, the optical connector can be pulled out by the so-called lever principle.

The connector extracting jig described above may be made of aluminum. In this case, durability of the connector extracting jig can be improved, and the connector extracting jig can be manufactured with good efficiency because aluminum is a material that is easy to cut.

The connector extracting jig described above may be made of a resin. In this case, it is possible to easily produce the connector extracting jig by resin molding, and it is possible to reduce cost of the material.

Details of Embodiments

Hereinafter, specific examples of the connector extracting jig will be described with reference to the drawings. The present invention is not limited to the following examples, but is intended to include all changes within the scope of the claims and equivalents within the scope of the claims. In the description of the drawings, the same or corresponding elements are denoted by the same reference numerals and redundant explanations are appropriately omitted. In addition, the drawings are sometimes drawn in a simplified or exaggerated manner in part in order to facilitate understanding, and the dimension, the angle, and the like are not limited to those described in the drawings.

Figure 1:
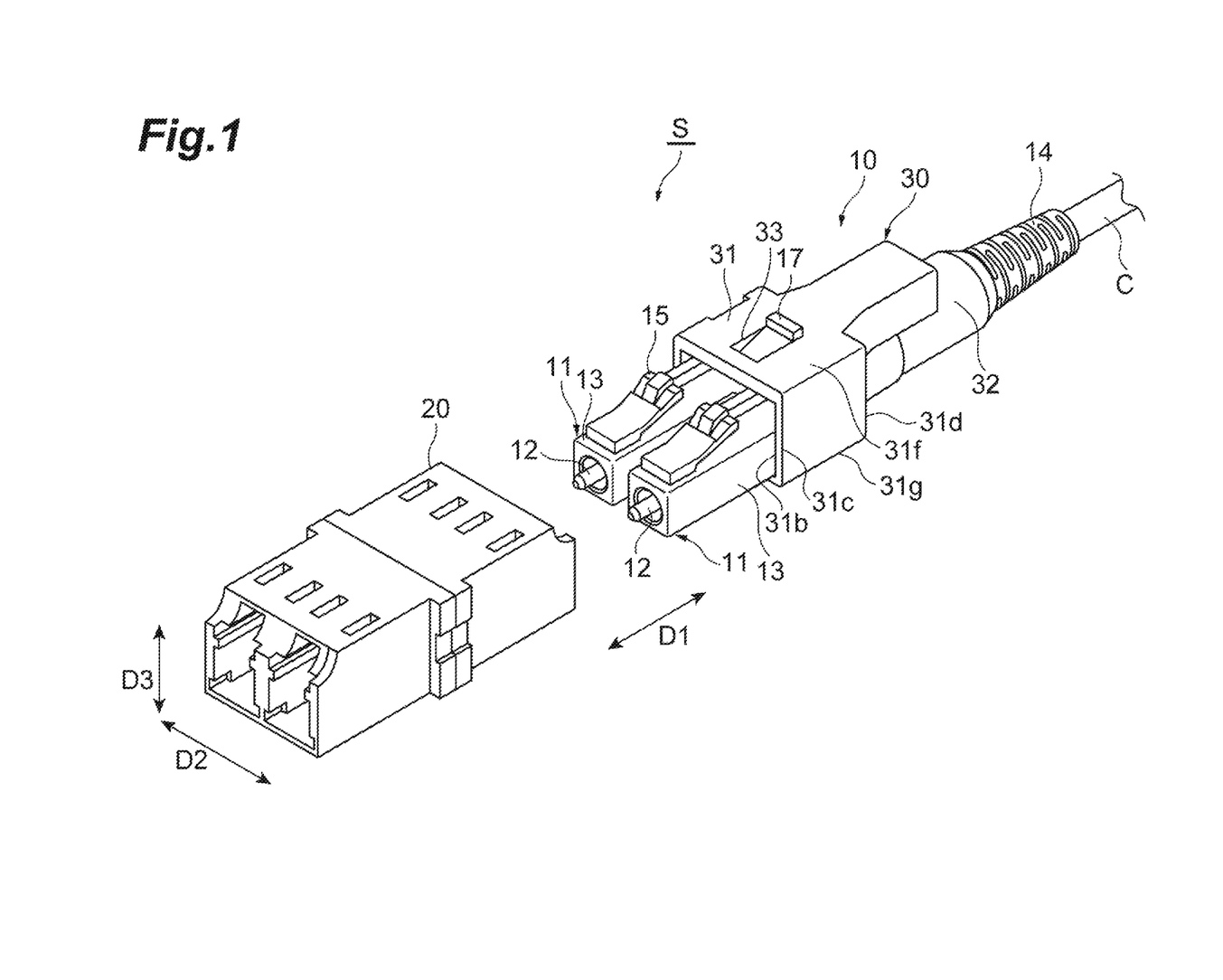
FIG. 1 is a perspective view illustrating an exemplary connector structure using a connector extracting jig according to an embodiment.

FIG. 1 is a perspective view illustrating an optical connector 10 and an adapter 20 of an exemplary connector structure S according to an embodiment. In the connector structure S according to the present embodiment, the optical connector is connected to a component to be connected along a connection direction D1. The "connection direction" refers to a direction in which the optical connector and the component to be connected are arranged. The "component to be connected" indicates a component to which the optical connector is connected, and can be, for example, an adapter and an optical transceiver. In the connector structure S according to the present embodiment, the optical connector 10 is connected to each of the adapter 20 and the optical transceiver. In addition, FIG. 1 illustrates an example of the adapter 20, the optical transceiver has an optical receptacle with the same configuration as the adapter 20. The optical receptacle is provided at one end of a housing of the optical transceiver.

The optical connector 10 and the adapter 20 are provided in an optical wiring rack of a data center, for example. As an example, the optical wiring rack includes a panel and a plurality of adapters 20 held in the panel. The adapter 20 is held in a state of being inserted into each of a plurality of holes formed in the panel. For example, the optical connector 10 includes a latch 15 engaging with the adapter 20, and the optical connector 10 is connected to the adapter 20 by the engagement of the latch 15 with the adapter 20.

Recently, in accordance with the increase in data traffic, a multi-core of an optical wiring rack to which the optical connectors are connected is performed, and the number of adapters is thus increasing. Therefore, since the density of the adapters in the optical wiring rack is increased, it is not be easy to insert and extract the optical connector into and from the adapter. Specifically, since the fingers or the like may not enter the optical connector due to the increase in the density of the adapters, it may be difficult to insert and extract the optical connector with the fingers or the like.

Here, the optical connector 10 according to the present embodiment includes a pull tab 30, and the pull tab 30 includes a push-pull mechanism for pushing down the latch 15 and releasing the engagement of the latch 15 with respect to the adapter 20 when being pulled toward an opposite side of the adapter 20. The push-pull mechanism can easily release the engagement of the latch 15 with the adapter 20 by pulling the pull tab 30 extending from the optical connector 10 to the opposite side of the adapter 20 toward the opposite side of the adapter 20. Therefore, the optical connector 10 can be easily pulled out from the adapter 20.

However, in the insertion and extraction of the optical connector 10 into and from the optical transceiver, since the optical receptacle of the optical transceiver is made of a metal, the metal of the optical receptacle may bite into the latch 15 when the pull tab 30 is pulled and the latch 15 is pushed down. If the metal of the optical receptacle bites into the latch 15, it may not be possible to push down the latch 15 efficiently. Therefore, the optical connector 10 according to the present embodiment includes a protrusion 17 that can directly push down the latch 15. The latch 15 and the protrusion 17 will be described in detail later.

The optical connector 10 includes two optical connector plugs 11 connected to the adapter 20. For example, the two optical connector plugs 11 are arranged along a direction D2 intersecting the connection direction D1, and the pull tab 30 is connected to each optical connector plug 11. A material of the optical connector plug 11 and the pull tab 30 is, for example, a resin material, but can be changed as appropriate. The optical connector plug 11 is an LC connector.

The optical connector plug 11 includes a ferrule 12 holding an optical fiber, a housing 13 accommodating the ferrule 12, and a boot 14 extending from the housing 13 to the opposite side of the adapter 20. An optical cable C with an optical fiber extending to the opposite side of the adapter 20 extends from the boot 14. Further, in the following description, a description is sometimes made by assuming that a direction (an adapter 20 side) of the connection direction D1 in which the adapter 20 is provided when being viewed from the optical connector 10 is referred to as a front side, and an opposite direction (an opposite side of the adapter 20) thereof is referred to as a rear side.

The pull tab 30 collectively holds the plurality of optical connector plugs 11 arranged in the direction D2, for example. Each optical connector plug 11 is slidable by a predetermined amount in the connection direction D1 with respect to the pull tab 30, for example. The pull tab 30, for example, accommodates a portion of the latch 15 and extends rearward from the latch 15. As an example, the pull tab 30 includes an accommodating part 31 accommodating a portion of the latch 15, and a gripping part 32 extending rearward from the accommodating part 31.

The accommodating part 31 is formed in, for example, a box-like shape having an opening 31b extending in the direction D2 and a direction D3 and oriented in the connection direction D1. A pair of optical connector plugs 11 can be moved in the connection direction D1 in the opening 31b. Further, the direction D3 is a direction intersecting both the connection direction D1 and the direction D2, and for example, the connection direction D1, the direction D2, and the direction D3 are orthogonal to each other. The accommodating part 31 formed in the box-like shape has a front wall portion 31c that faces the front and defines an opening 31b, a rear wall portion 31d that faces the rear, an upper wall portion 31f formed with an opening portion 33 described later, and a lower wall portion 31g positioned on an opposite side of the upper wall portion 31f as seen from the optical connector plug 11. The gripping part 32 extends rearward from the upper wall portion 31f, for example. The gripping part 32 is a part for pulling rearward the pull tab 30, and the optical connector 10 is pulled out from the adapter 20 by pulling rearward the gripping part 32.

Figure 2:
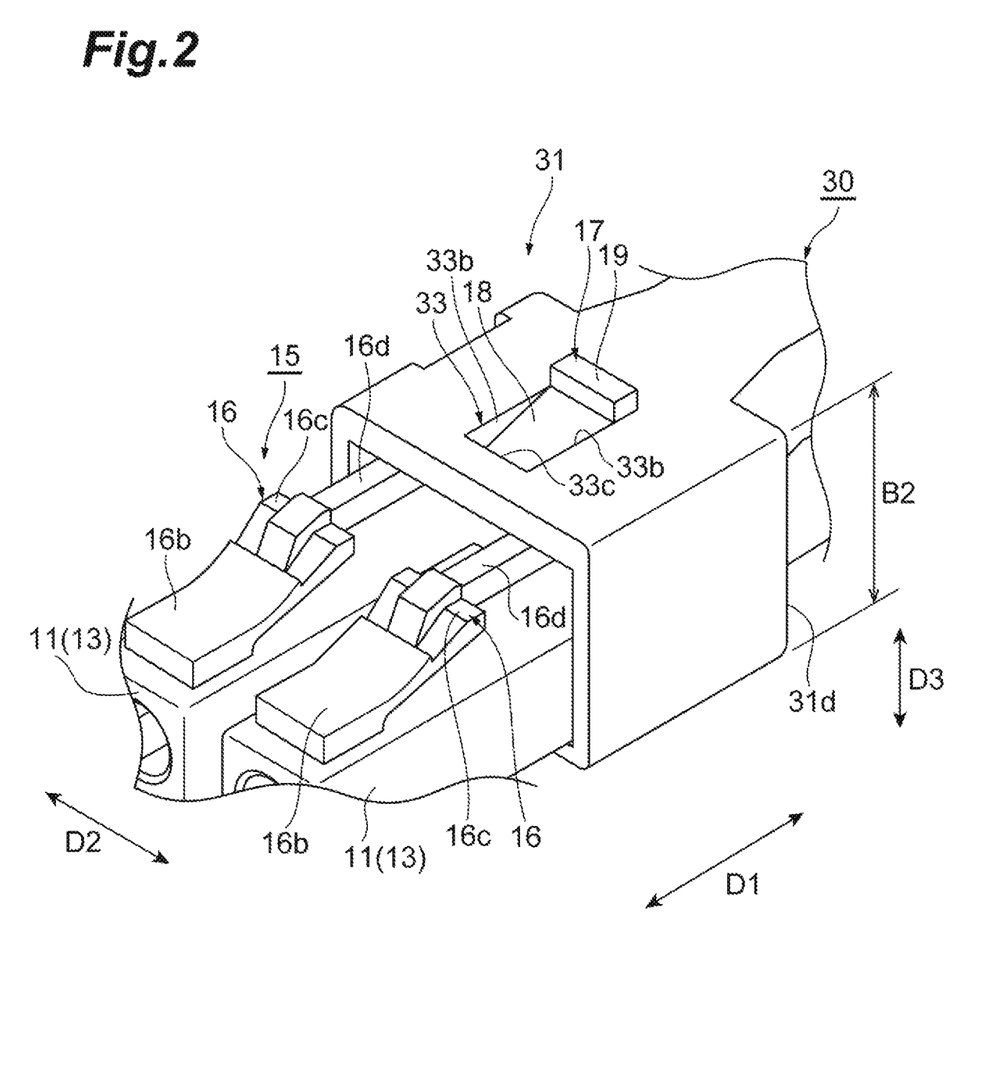
FIG. 2 is a perspective view illustrating a latch and a pull tab of the connector structure of FIG. 1.
Figure 3:
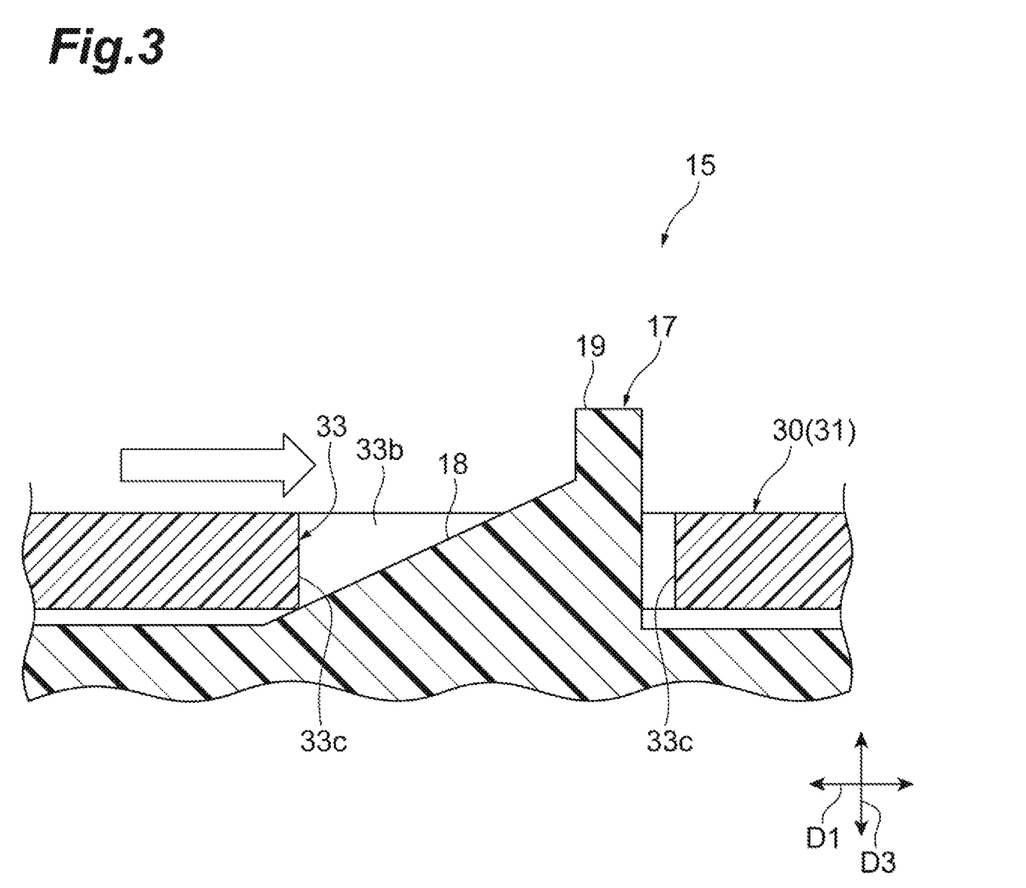
FIG. 3 is a cross-sectional view illustrating a protrusion of the latch of FIG. 2.

FIG. 2 is an enlarged perspective view of the latch 15 and the accommodating part 31. FIG. 3 is a cross-sectional view illustrating the protrusion 17 and the accommodating part 31 of the latch 15. As illustrated in FIGS. 2 and 3, the latch 15 includes an engaging part 16 engaged with the adapter 20 and a protrusion 17 positioned behind the engaging part 16. The engaging part 16 is provided on each of the plurality of optical connector plugs 11, and the plurality of optical connector plugs 11 are connected to the adapters 20 by engaging each engaging part 16 with the adapter 20.

The engaging part 16 includes, for example, a fixing portion 16b fixed to the housing 13, a fitting portion 16c extending rearward and obliquely upward from the fixing portion 16b, and an extending portion 16d further extending rearward from the fitting portion 16c. The fixing portion 16b, the fitting portion 16c, and the extending portion 16d are arranged in this order from the front toward the rear. The pair of extending portions 16d arranged along the direction D2 is joined in the inside of the accommodating part 31, and the protrusion 17 is provided behind the extending portion 16d joining together. The protrusion 17 has an inclined portion 18 positioned in front thereof and a top portion 19 positioned at a rear end of the inclined portion 18. The inclined portion 18 is inclined downward, for example, in the front thereof.

The accommodating part 31 has the opening portion 33 opened in the direction D3 intersecting the connection direction D1 and accommodates portions of the latch 15 (e.g., the extending portion 16d of the engaging part 16 and the protrusion 17). The opening portion 33 is opened, for example, in a rectangular shape in the direction D3, and the protrusion 17 protrudes from the opening portion 33. As an example, the opening portion 33 is formed in a rectangular shape having a long side extending in the connection direction D1 and a short side extending in the direction D2. The opening portion 33 may be defined by a pair of first inner side surfaces 33b extending in both the connection direction D1 and the direction D3 and a pair of second inner side surfaces 33c extending in both the direction D2 and the direction D3. However, the shape and the size of the opening portion 33 are not limited to the above-described examples and can be changed as appropriate.

The pull tab 30 is provided with the above-mentioned push-pull mechanism, and it is possible to release the engagement of the latch 15 with the adapter 20 by pulling the pull tab 30 in the connection direction D1 by the push-pull mechanism. Hereinafter, the push-pull mechanism of the pull tab 30 will be described in more detail. First, each fitting portion 16c, each extending portion 16d, and the protrusion 17 of the latch 15 are movable in the direction D3 by being bent in the direction D3 with each fixing portion 16b as a starting point.

The inclined portion 18 of the protrusion 17 abuts on the second inner side surface 33c positioned on the front side of the pull tab 30, and when the accommodating part 31 moves rearward in response to the pulling of the pull tab 30, a lower end of the second inner side surface 33c slides from the inclined portion 18 toward the top portion 19 and pushes down the inclined portion 18 so that the protrusion 17 is pushed down. Since the pair of extending portions 16d and the pair of fitting portions 16c are pushed down when the protrusion 17 is pushed down, the engagement of each fitting portion 16c with the adapter 20 is released and the engagement of the latch 15 with the adapter 20 is released. In addition, it is possible to pull out the optical connector 10 from the adapter 20 by further pulling the pull tab 30 in the state in which the engagement of the latch 15 is released.

In the connector structure S according to the present embodiment, the protrusion 17 of the latch 15 can be pushed down so that the engagement of the latch 15 with the adapter 20 is released when the protrusion 17 is pushed down. That is, when the protrusion 17 is pushed down to the opening portion 33, the pair of extending portions 16d and the pair of fitting portions 16c are pushed down, whereby the fitting of each fitting portion 16c with the adapter 20 is released to release the engagement of the latch 15 with the adapter 20 so that the optical connector 10 can be pulled out. In this way, when the protrusion 17 is directly pushed down, it is possible to reduce the sliding of the latch 15 against other components (such as the adapter, or the pull tab 30), thereby making it possible to prevent the latch 15 from being damaged.

However, as described above, when the density of the adapter 20 is increased, it may be difficult to directly push down the protrusion 17 with a finger or the like, and therefore, the connector structure S may be easily pulled out by pulling the pull tab 30 extending to the rear. However, when the pull tab 30 is pulled, there is a concern that it is difficult to pull the pull tab 30 or the latch 15 is scratched due to the occurrence of the biting as described above.

Figure 4:
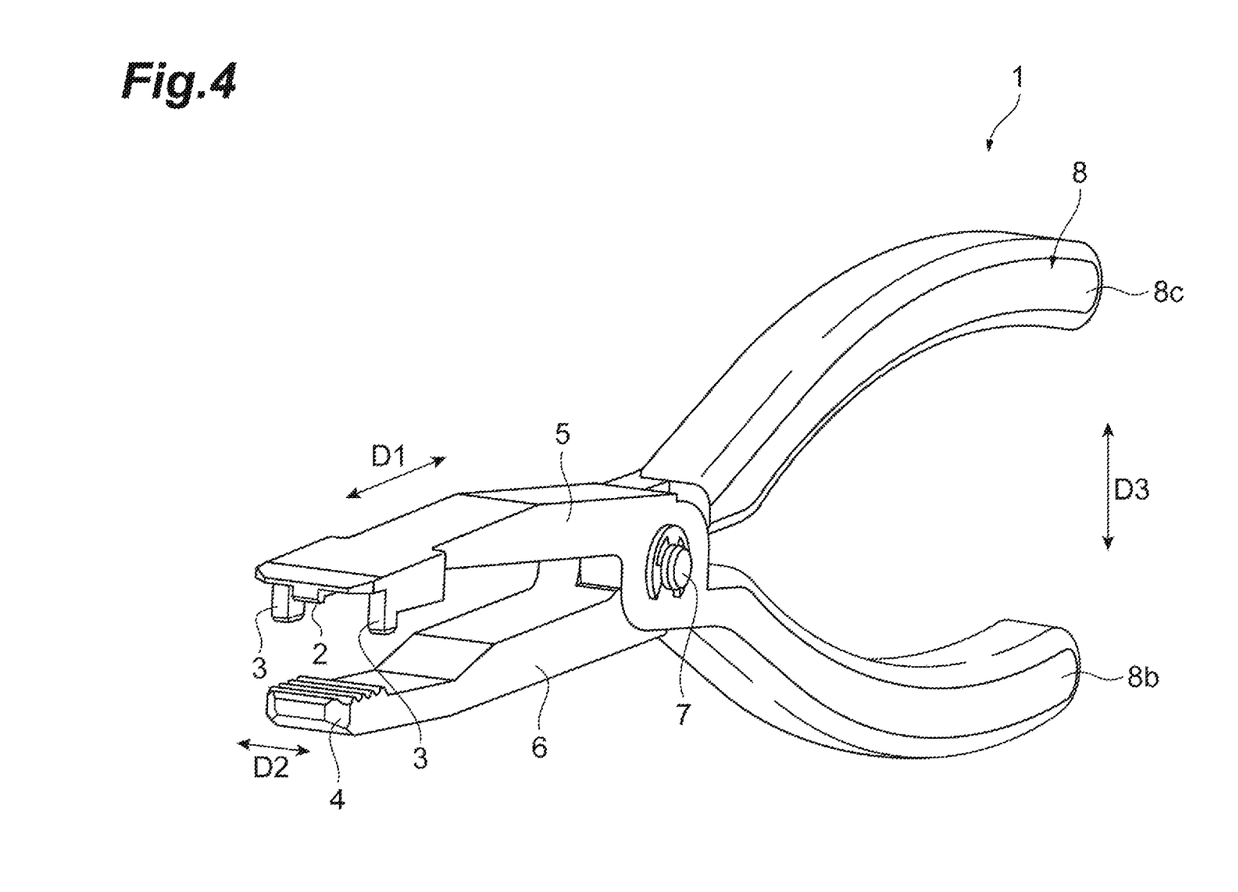
FIG. 4 is a perspective view illustrating an exemplary connector extracting jig according to an embodiment.
Figure 5:
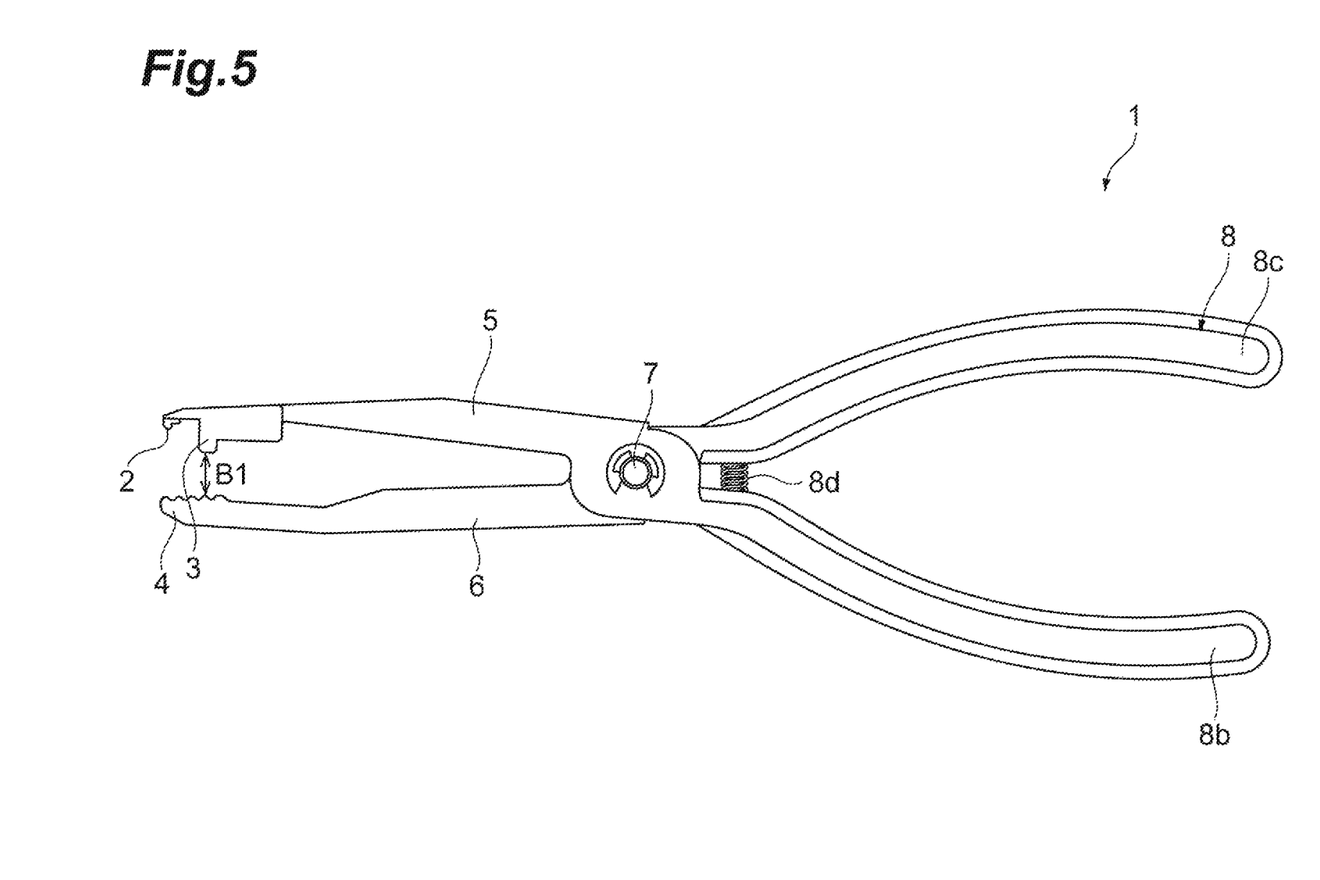
FIG. 5 is a side view of the connector extracting jig of FIG. 4.

Here, in the connector extracting jig 1 according to the present embodiment, it is possible to push down the protrusion 17 by operating the connector extracting jig 1 from the rear. FIG. 4 is a perspective view illustrating a connector extracting jig 1 according to an embodiment. FIG. 5 is a side view of the connector extracting jig 1. The connector extracting jig 1 includes a pushing-down part 2 pushing down the protrusion 17, a butting part 3 butting on the optical connector 10, a sandwiching part 4 sandwiching the optical connector 10, a first extending part 5 and a second extending part 6 extending to the rear, a supporting shaft 7, and a handle part 8.

The connector extracting jig 1 is made of, for example, aluminum. However, a material of the connector extracting jig 1 may be, for example, resin, or may be stainless steel or zinc. As such, the material of the connector extracting jig can be changed as appropriate. The connector extracting jig 1 has a symmetrical shape with respect to a reference surface, for example, passing through the center of the direction D2 of the connector extracting jig 1 and extending in the connection direction D1 and the direction D3.

The first extending part 5 is a portion extending rearward from the pushing-down part 2 and the butting part 3, and the second extending part 6 is a portion extending rearward from the sandwiching part 4. A rear portion of the first extending part 5 and a rear portion of the second extending part 6 are both rotatably supported by the supporting shaft 7, and the first extending part 5 and the second extending part 6 are openable and closable around the supporting shaft 7. Here, "openable and closable" indicates that a distance between the first extending part 5 and the second extending part 6 can be adjusted, and for example, a case where the distance between the first extending part 5 and the second extending part 6 is longer than a certain value is "opened", and a case where the distance between the first extending part 5 and the second extending part 6 is shorter than the certain value is "closed". In the present embodiment, it is possible to sandwich the optical connector 10 in a state in which the first extending part 5 and the second extending part 6 are opened, and the pushing-down part 2 pushes down the protrusion 17 in a state in which the first extending part 5 and the second extending part 6 are closed.

The handle part 8 includes, for example, a first gripping portion 8b connected to the first extending part 5 through the supporting shaft 7, a second gripping portion 8c connected to the second extending part 6 through the supporting shaft 7, and a spring 8d interposed between the first gripping portion 8b and the second gripping portion 8c. The spring 8d is, for example, a compression coil spring which exerts a force in a direction to disengage the first gripping portion 8b and the second gripping portion 8c from each other. The first extending part 5 and the second extending part 6 are in an opened state in a state in which an external force is not applied by interposing the spring 8d between the first gripping portion 8b and the second gripping portion 8c as described above. However, when the first gripping portion 8b and the second gripping portion 8c are gripped and the first gripping portion 8b and the second gripping portion 8c approach each other against the applied force of the spring 8d, the first extending part 5 and the second extending part 6d are in a closed state, and the pushing-down part 2 can push down the protrusion 17.

Incidentally, an interval B1 between the butting part 3 and the sandwiching part 4 when the first extending part 5 and the second extending part 6 are opened is narrower than a width B2 of the accommodating part 31 (see FIG. 2). For example, the "width of the accommodating part" indicates a length of the accommodating part 31 accommodating the protrusion 17 which is pushed down in the direction D3. As the interval B1 between the butting part 3 and the sandwiching part 4 when the first extending part 5 and the second extending part 6 are opened is narrower than the width B2 of the accommodating part 31 as described above, it is possible to easily bring the connector extracting jig 1 closer to the accommodating part 31 in the opened state. That is, by preventing the first extending part 5 and the second extending part 6 from being excessively opened, the butting part 3 easily butts on the accommodating part 31 so that it is possible to easily position the pushing-down part 2 with respect to the protrusion 17.

Figure 6:
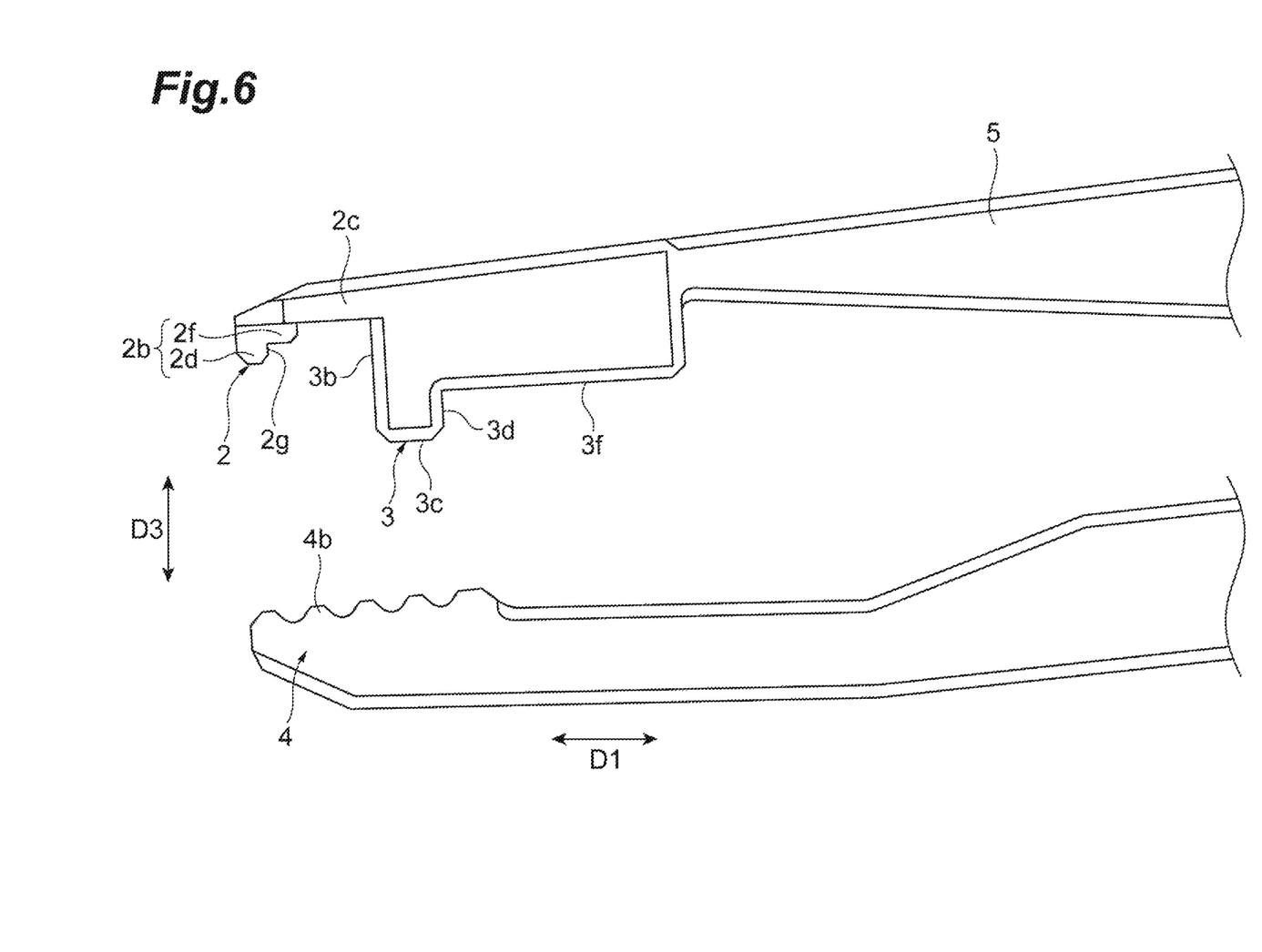
FIG. 6 is a side view illustrating a pushing-down part, a butting part, and a sandwiching part of the connector extracting jig of FIG. 4.
Figure 7:
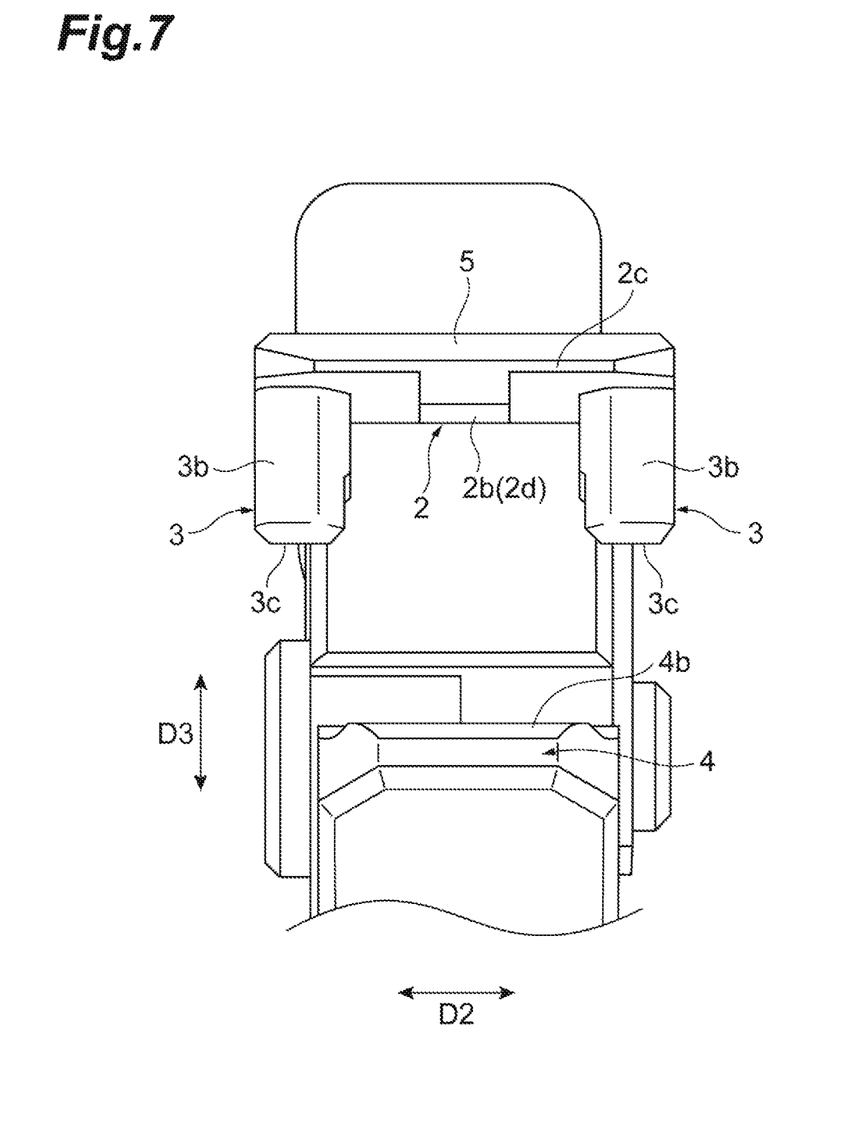
FIG. 7 is a front view illustrating the pushing-down part, the butting part, and the sandwiching part of FIG. 6.

FIG. 6 is an enlarged side view of the pushing-down part 2, the butting part 3, and the sandwiching part 4. FIG. 7 is a front view of the pushing-down part 2, the butting part 3, and the sandwiching part 4 when being viewed from the front. As illustrated in FIGS. 6 and 7, the pushing-down part 2 is positioned at a front end of the first extending part 5 and the butting part 3 is positioned behind the pushing-down part 2. The sandwiching part 4 faces the pushing-down part 2 and the butting part 3 in the direction D3. The sandwiching part 4 has, for example, a concave and convex portion 4b on a surface facing the pushing-down part 2 and the butting part 3.

The pushing-down part 2 has, for example, a convex portion 2b protruding toward the sandwiching part 4 and an extending portion 2c positioned behind the convex portion 2b. The convex portion 2b further includes a first convex portion 2d positioned on the front side and a second convex portion 2f positioned on the rear side. The first convex portion 2d, the second convex portion 2f, and the extending portion 2c are arranged in this order from the front toward the rear. The first convex portion 2d has a scraping surface 2g facing the rear. For example, when the second convex portion 2f pushes down the protrusion 17, the scraping surface 2g faces the front surface of the top portion 19 of the protrusion 17, and in this state, it is possible to scrape the optical connector 10 with the scraping surface 2g by pulling the connector extracting jig 1 rearward together with the pull tab 30.

The butting part 3 is provided behind the extending portion 2c of the pushing-down part 2, and for example, a pair of butting parts 3 are provided along the direction D2. In this case, each butting part 3 protrudes toward the sandwiching part 4 from an end portion of the extending portion 2c in the direction D2, such that the pair of butting parts 3 is formed as a pair of legs extending downward. The butting part 3 has, for example, a butting surface 3b facing the front and extending from the extending portion 2c to the sandwiching part 4, an end surface 3c extending in the connection direction D1 from an end portion of the butting surface 3b of the sandwiching part 4 side, a rear side surface 3d extending upward from an end portion of the end surface 3c on the opposite side to the butting surface 3b, and an extending surface 3f extending rearward from an upper end of the rear side surface 3d. The butting surface 3b is a portion that allows the rear wall portion 31d of the accommodating part 31 of the optical connector 10 to butt in the connection direction D1, and the convex portion 2b (second convex portion 2f) of the pushing-down part 2 faces the protrusion 17 in the direction D3 when the butting surface 3b butts on the rear wall portion 31d.

Next, effects obtained from the connector extracting jig 1 according to the present embodiment will be described. As illustrated in FIGS. 1 and 4, the connector extracting jig 1 includes the butting part 3 butting on the optical connector 10 in the connection direction D1, and the pushing-down part 2 facing the protrusion 17 of the latch 15 of the optical connector 10 in the direction D3 when the butting part 3 butts on the optical connector 10. The optical connector 10 is connected to the adapter 20 by the engagement of the latch 15 with the adapter 20, and the engagement of the latch 15 with the adapter 20 is released by pushing down the latch 15. In addition, the latch 15 has the protrusion 17 that can be pushed down to release the engagement of the latch 15 when being pushed down, and it is possible to release the engagement of the latch 15 by pushing down the protrusion 17.

The connector extracting jig 1 has the pushing-down part 2 facing the protrusion 17 of the latch 15 in the direction D3 when the butting part 3 butts on the optical connector 10. Therefore, since a position of the pushing-down part 2 relative to the protrusion 17 can be automatically determined by butting the butting part 3 against the optical connector 10, a positioning of the connector extracting jig 1 against the optical connector 10 can be easily performed by butting the butting part 3 on the optical connector 10. As described above, the optical connector 10 can be easily pulled out from the adapter 20 by automatically performing the positioning and then pushing down the protrusion 17 of the latch 15 by the pushing-down part 2 to pull out the optical connector 10.

The pushing-down part 2 may have the convex portion 2b protruding toward the protrusion 17. In this case, since the convex portion 2b faces the protrusion 17, the protrusion 17 of the latch 15 can be easily pushed down by the convex portion 2b of the pushing-down part 2.

The convex portion 2b may have the scraping surface 2g that scrapes the optical connector 10 to the opposite side of the adapter 20. In this case, it is possible to scrape the optical connector 10 to the opposite side of the adapter 20 by the scraping surface 2g in a state in which the protrusion 17 of the latch 15 is pushed down by the convex portion 2b of the pushing-down part 2. Therefore, the optical connector 10 can be more smoothly pulled out.

The connector extracting jig 1 may include a pair of butting parts 3 arranged along the direction D2 intersecting both the connection direction D1 and the direction D3. In this case, since the butting parts 3 are provided in pairs along the direction D2, the positioning of the connector extracting jig 1 against the optical connector 10 can be stably performed by butting the pair of butting parts 3 on the optical connector 10.

The connector extracting jig 1 may further include a sandwiching part 4 sandwiching the optical connector 10 together with the pushing-down part 2 and the butting part 3, a first extending part 5 extending from the pushing-down part 2 and the butting part 3 to the opposite side of the adapter 20, a second extending part 6 extending from the sandwiching part 4 to the opposite side of the adapter 20, and a supporting shaft 7 supporting the first extending part 5 and the second extending part 6 so as to be openable and closable. In this case, the optical connector 10 can be pulled out in a state in which the optical connector 10 is sandwiched by the pushing-down part 2, the butting part 3, and the sandwiching part 4. Therefore, the optical connector 10 can be pulled out in a stable state.

The connector extracting jig 1 may further include a handle part 8 extending from the supporting shaft 7 to opposite sides of the first extending part 5 and the second extending part 6, and closing the first extending part 5 and the second extending part 6 when being gripped. In this case, the connector extracting jig 1 can be shaped like a pincer with the handle part 8. Therefore, since it is possible to understand intuitively how to use the connector extracting jig 1, it is possible to make the shape of the connector extracting jig 1 more comfortable to use.

An interval B1 between the butting part 3 and the sandwiching part 4 when the first extending part 5 and the second extending part 6 are opened may be narrower than a width B2 of the accommodating part 31 accommodating the protrusion 17. In this case, the second extending part 6 provided with the sandwiching part 4 can be prevented from being excessively opened with respect to the first extending part 5 provided with the pushing-down part 2 and the butting part 3. Therefore, since it is possible to prevent the pushing-down part 2, the butting part 3, and the sandwiching part 4 from being excessively opened with respect to the optical connector 10, the positioning the connector extracting jig 1 against the optical connector 10 can be more easily performed.

The connector extracting jig 1 may be made of aluminum. In this case, durability of the connector extracting jig 1 can be improved, and the connector extracting jig 1 can be manufactured with good efficiency because aluminum is a material that is easy to cut.

Figure 8:
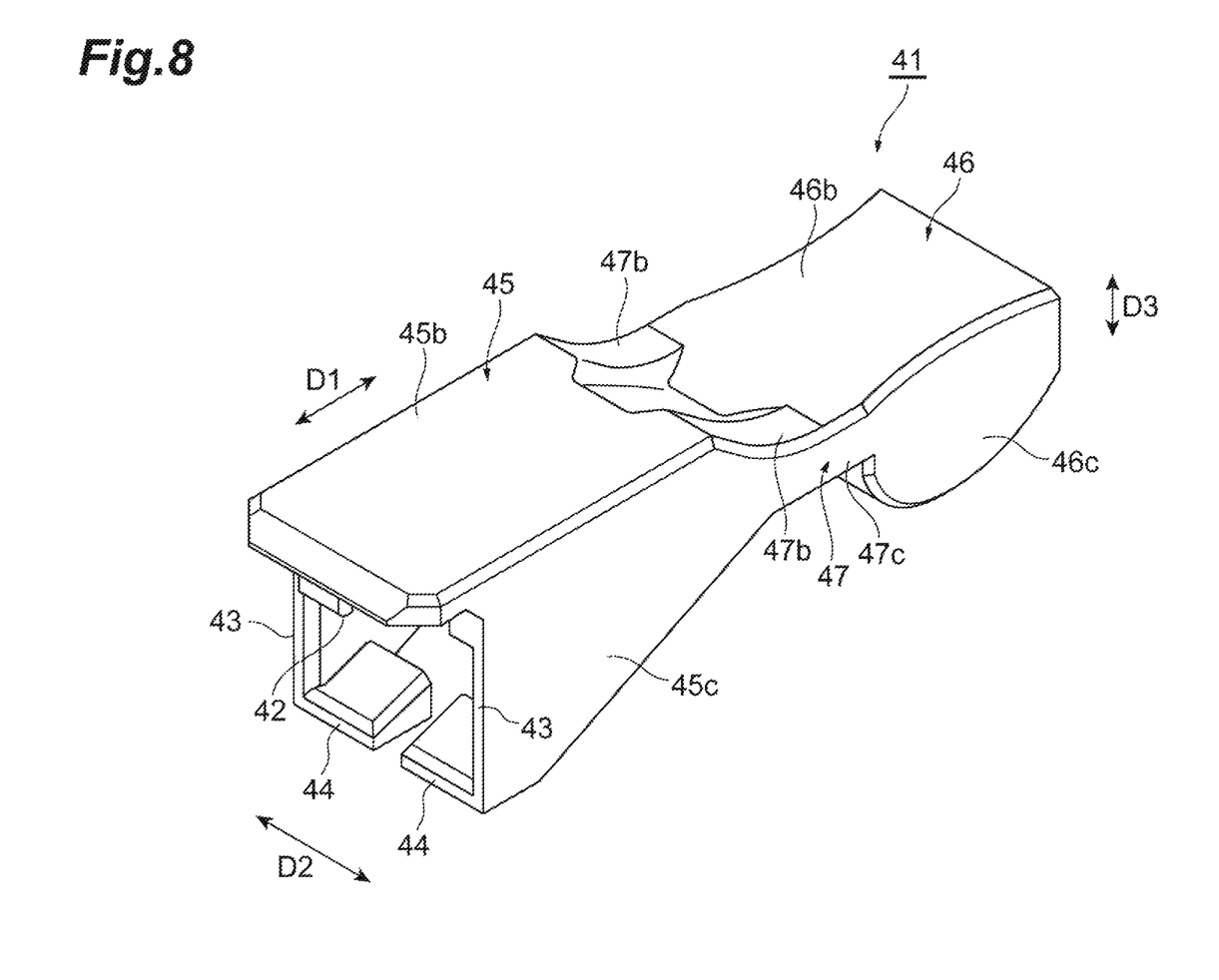
FIG. 8 is a perspective view illustrating a connector extracting jig according to a modified example.
Figure 9:
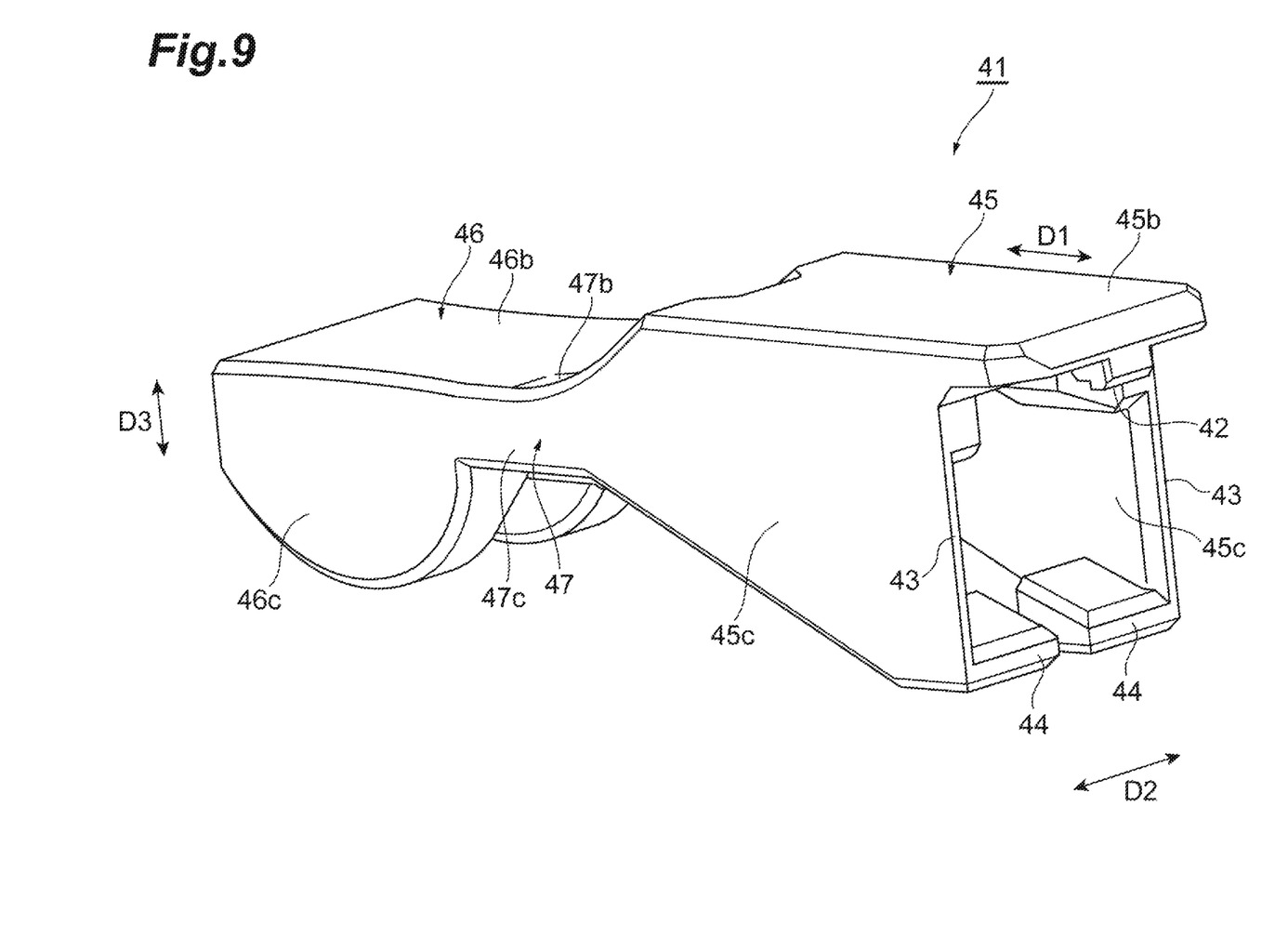
FIG. 9 is a perspective view of the connector extracting jig of FIG. 8 as viewed from a direction different from that in FIG. 8.

Next, a connector extracting jig 41 according to a modified example will be described with reference to FIGS. 8 to 11. FIGS. 8 and 9 are perspective views illustrating a connector extracting jig 41. In the connector extracting jig 41, it is possible to push down the protrusion 17 and pull out the optical connector 10 from the adapter 20 by operating the connector extracting jig 41 from the rear in the same manner as in the connector extracting jig 1 described above. Hereinafter, a description overlapping with the connector extracting jig 1 described above will be appropriately omitted.

The connector extracting jig 41 is made of, for example, a resin material. However, a material of the connector extracting jig 41 may be, for example, aluminum, or may be stainless steel or zinc, and can be changed as appropriate. The connector extracting jig 41 includes a pushing-down part 42 pushing down the protrusion 17, a pair of butting parts 43 butting on the optical connector 10, a surrounding part 44 surrounding the optical connector 10 together with the pushing-down part 42 and the butting parts 43, an extending part 45 extending to the rear, and a gripping part 46 positioned at a rear end of the extending part 45. The connector extracting jig 41 has a symmetrical shape with respect to a reference surface, for example, passing through the center of the direction D2 of the connector extracting jig 41 and extending in the connection direction D1 and the direction D3.

The extending part 45 has, for example, a first extending portion 45b extending rearward from the pushing-down part 42, and a second extending portion 45c extending rearward from each of the pair of butting parts 43. The first extending portion 45b and the second extending portion 45c are both formed, for example, in a flat shape. The first extending portion 45b is formed in a substantially rectangular shape, and the pushing-down part 42 may protrude forward from a front end of the first extending portion 45b. The second extending portion 45c has a side surface of the connector extracting jig 41 facing the direction D2 and a width of the second extending portion 45c is narrowed toward the rear.

The gripping part 46 is positioned behind the first extending portion 45b and the second extending portion 45c, and is connected to the extending part 45 through a connecting part 47 with a narrowed width, for example. The connecting part 47 has a pair of bridge portions 47b provided along the direction D2 and side portions 47c extending downward from an end portion of each bridge portion 47b in the direction D2. Each bridge portion 47b extends, for example, to be obliquely and downwardly curved from a rear end of the first extending portion 45b, and each side portion 47c extends rearward from the second extending portion 45c. The side portion 47c is formed, for example, in a flat shape together with the second extending portion 45c.

The gripping part 46 is a portion for pushing down the protrusion 17 by pushing down the pushing-down part 42 by pulling the surrounding part 44 as a supporting point to the optical connector 10, for example. For example, the gripping part 46 includes a first portion 46b extending rearward from each bridge portion 47b of the connecting part 47, and a second portion 46c extending rearward from each side portion 47c of the connecting part 47. For example, the first portion 46b and the second portion 46c are both formed in a flat shape. The second portion 46c is extended to the side portion 47c of the connecting part 47 and has a shape that allows the second portion 46c to be easily picked with a finger or the like. As an example, the second portion 46c extends in a circular arc from the rear end of the side portion 47c downward.

Figure 10:
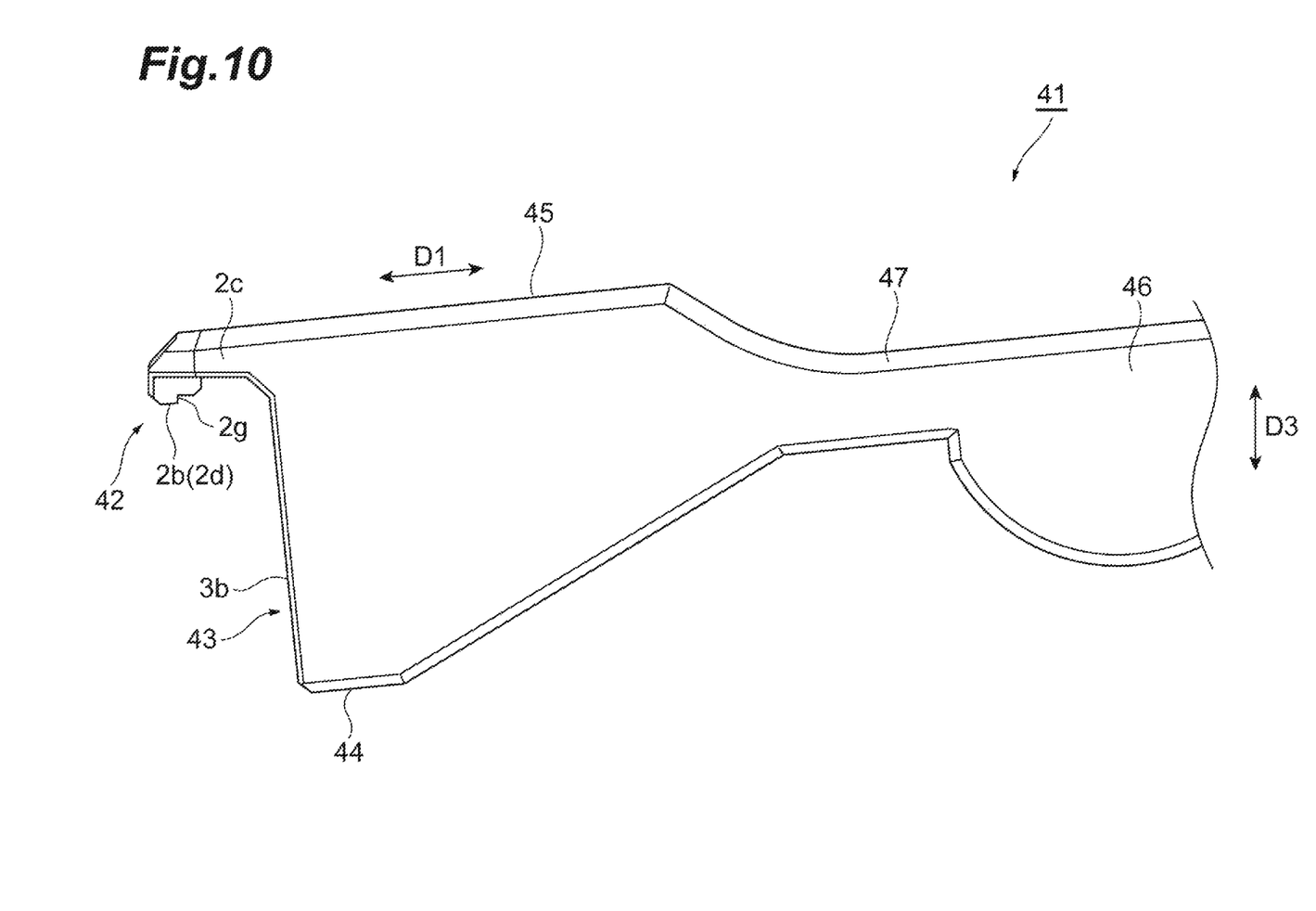
FIG. 10 is a side view of the connector extracting jig of FIG. 8.
Figure 11:
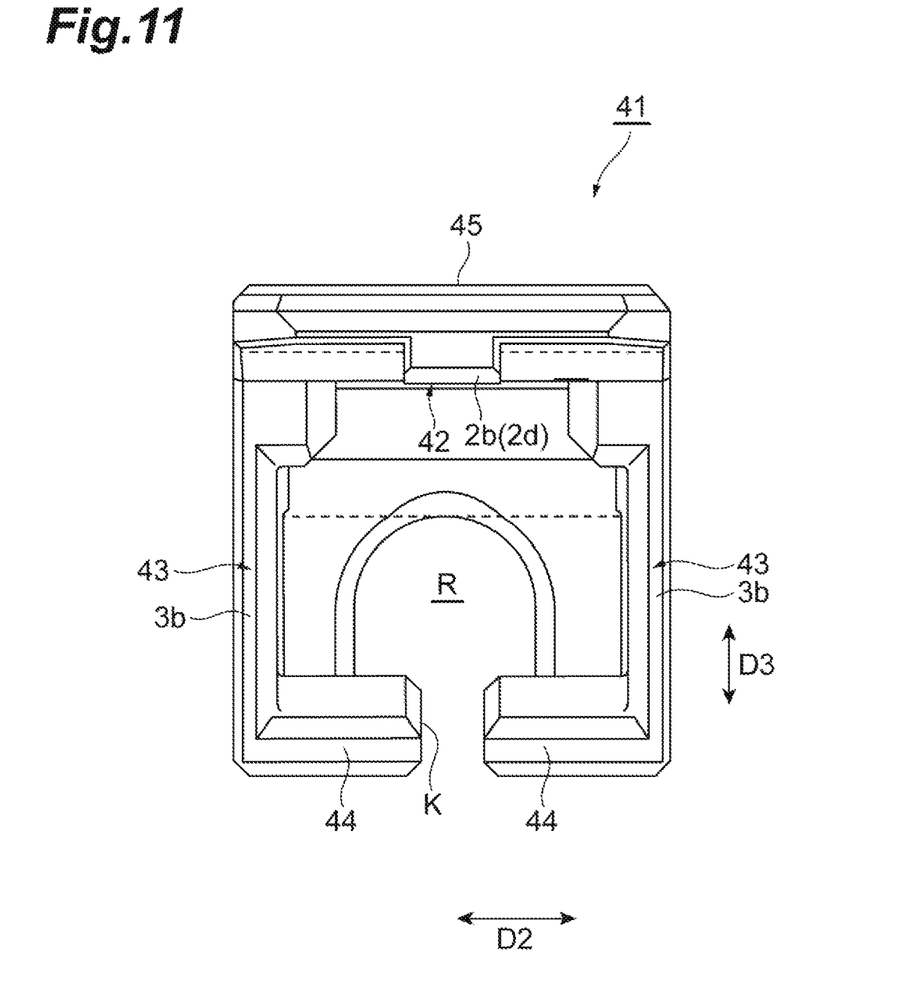
FIG. 11 is a front view illustrating a pushing-down part, a butting part, and a surrounding part of the connector extracting jig of FIG. 8.

FIG. 10 is a side view illustrating the pushing-down part 42, the butting part 43, and the surrounding part 44. FIG. 11 is a front view of the pushing-down part 42, the butting part 43, and the surrounding part 44 when being viewed from the front. As illustrated in FIGS. 10 and 11, the pushing-down part 42 is positioned at the front end of the extending part 45 and the butting part 43 and the surrounding part 44 are positioned behind the pushing-down part 42. For example, the connector extracting jig 41 includes a pair of surrounding parts 44, and the surrounding parts 44 serve as supporting points when the pushing-down part 42 pushes down the protrusion 17.

Each surrounding part 44 faces the pushing-down part 42 and is connected to the pushing-down part 42 through each butting part 43. Each surrounding part 44 extends from the lower ends of the pair of butting parts 43 to the inside of the connector extracting jig 41 in the direction D2. A slit K is formed between the pair of surrounding parts 44. The pushing-down part 42, the pair of butting parts 43, and the pair of surrounding parts 44 are formed in a rectangular shape. The optical connector 10 is surrounded in a region R of the rectangular shape defined by the pushing-down part 42, the pair of butting parts 43, and the pair of surrounding parts 44 which are formed in the rectangular shape. A part of the optical connector 10 can be accommodated in the region R from the slit K formed between the pair of surrounding parts 44.

The pushing-down part 42 includes a convex portion 2b protruding toward the surrounding part 44 and an extending portion 2c extending to the rear of the convex portion 2b in the same manner as the pushing-down part 2, and a first convex portion 2d of the convex portion 2b is formed with a scraping surface 2g facing the rear. The butting parts 43 are provided behind the extending portion 2c in the same manner as the butting part 3, and each butting part 43 extends from the pushing-down part 42 to the surrounding part 44. The butting part 43 has, for example, the same butting surface 3b as the butting part 3, and when the butting surface 3b butts on the rear wall portion 31d, the convex portion 2b of the pushing-down part 42 faces the protrusion 17 in the direction D3.

Hereinabove, the connector extracting jig 41 according to the modified example has the pushing-down part 42 facing the protrusion 17 of the latch 15 when the butting parts 43 butt on the optical connector 10. Therefore, since a position of the pushing-down part 42 relative to the protrusion 17 can be automatically determined by butting the butting parts 43 against the optical connector 10, a positioning of the connector extracting jig 41 against the optical connector 10 can be easily performed by butting the butting parts 43 on the optical connector 10. Therefore, the same effect as that of the connector extracting jig 1 can be obtained from the connector extracting jig 41.

In addition, the connector extracting jig 41 may further include the surrounding parts 44 positioned on the opposite side of the pushing-down part 42 of the butting parts 43 and surrounding the optical connector 10 together with the pushing-down part 42 and the butting parts 43. In this case, since the optical connector 10 can be pulled out in a state in which the optical connector 10 is surrounded by the pushing-down part 42, the butting parts 43, and the surrounding parts 44, the optical connector 10 can be more stably pulled out.

The connector extracting jig 41 further includes an extending part 45 extending from the pushing-down part 42, the butting parts 43, and the surrounding parts 44 to the opposite side of the adapter 20, and a gripping part 46 positioned at an end portion of the extending part 45 opposite to the adapter 20, and the pushing-down part 42 may push down the protrusion 17 of the latch 15 by raising the gripping part 46 with the surrounding part 44 as a supporting point. In this case, the pushing-down part 42 can push down the protrusion 17 of the latch 15 by raising the gripping part 46 with the surrounding part 44 as the supporting point. Therefore, the optical connector 10 can be pulled out by the so-called lever principle.

The connector extracting jig 41 may be made of a resin material. In this case, it is possible to easily produce the connector extracting jig 41 by resin molding, and it is possible to reduce cost of the material.

Hereinafter, the embodiments and the modified example of the connector extracting jig according to the present disclosure have been described. However, the connector extracting jig according to the present disclosure is not limited to each example including the above-described embodiments and modified example, and various modifications are possible. That is, the shape, size, material, number, and arrangement of parts of the connector extracting jig can be changed as appropriate. For example, in the embodiments described, the example in which the component to be connected of the optical connector 10 to which the connector extracting jig is used is the adapter 20 is described. However, the component to be connected of the optical connector 10 may be other components such as an optical transceiver and the like.

What is claimed is:

1. A connector extracting jig for extracting an optical connector having a latch from a component to which the optical connector is connected along a connection direction via engagement of the latch with the component, the connector extracting jig comprising:

a pair of butting parts, each butting part configured to butt on the optical connector in the connection direction;

a pushing-down part configured to be positioned closer to the component than the pair of butting parts and face a protrusion of the latch along a first direction intersecting the connection direction when the butting parts butt on the optical connector;

a sandwiching part configured to sandwich the optical connector together with the pushing-down part and the butting parts;

a first extending part configured to extend from the pushing-down part and the pair of butting parts in an opposite direction of the component;

a second extending part configured to extend from the sandwiching part in the opposite direction of the component; and a supporting shaft configured to support the first extending part and the second extending part so as to be openable and closable, wherein the pair of butting parts are arranged along a second direction intersecting both the connection direction and the first direction, and the pushing-down part is arranged between the pair of butting parts in the second direction.

2. The connector extracting jig according to claim 1, wherein
the pushing-down part has a convex portion that protrudes toward the protrusion of the latch when the butting parts butt on the optical connector.

3. The connector extracting jig according to claim 2, wherein
the convex portion has a scraping surface for scraping the optical connector in the opposite direction of the component.

4. The connector extracting jig according to claim 1, further comprising:
a handle part configured to extend from the supporting shaft to opposite sides of the first extending part and the second extending part, and close the first extending part and the second extending part when being gripped.

5. The connector extracting jig according to claim 4, wherein
an interval between each of the butting parts and the sandwiching part when the first extending part and the second extending part are opened is narrower than a width of an accommodating part accommodating the protrusion of the latch.

6. The connector extracting jig according to claim 1, wherein
the connector extracting jig is made of aluminum.

7. The connector extracting jig according to claim 1, wherein
the connector extracting jig is made of a resin material.

* * * * *